(No Model.) 5 Sheets—Sheet 1.
G. E. HUNTER & F. H. CORTHELL.
APPARATUS FOR ADJUSTING WATCHES.

No. 437,206. Patented Sept. 30, 1890.

Witnesses
Chas. J. Williamson
Henry C. Hazard

Inventors
Geo. E. Hunter and Fred H. Corthell, by
Crindle and Russell their Attys (No Model.)  5 Sheets—Sheet 2.

G. E. HUNTER & F. H. CORTHELL.
APPARATUS FOR ADJUSTING WATCHES.

No. 437,206.  Patented Sept. 30, 1890.

(No Model.) 5 Sheets—Sheet 3.

G. E. HUNTER & F. H. CORTHELL.
APPARATUS FOR ADJUSTING WATCHES.

No. 437,206. Patented Sept. 30, 1890.

Witnesses
Chas. J. Williamson
Henry C. Hazard

Inventors
Geo. E. Hunter and Fred H. Corthell, by
Crindle and Russell, their Attys (No Model.) 5 Sheets—Sheet 4.
G. E. HUNTER & F. H. CORTHELL.
APPARATUS FOR ADJUSTING WATCHES.

No. 437,206. Patented Sept. 30, 1890.

Witnesses
Chas. J. Williamson.
Henry C. Hazard.

Inventors
Geo. E. Hunter and Fred. H. Corthell, by
Crindle and Russell, their Attys.

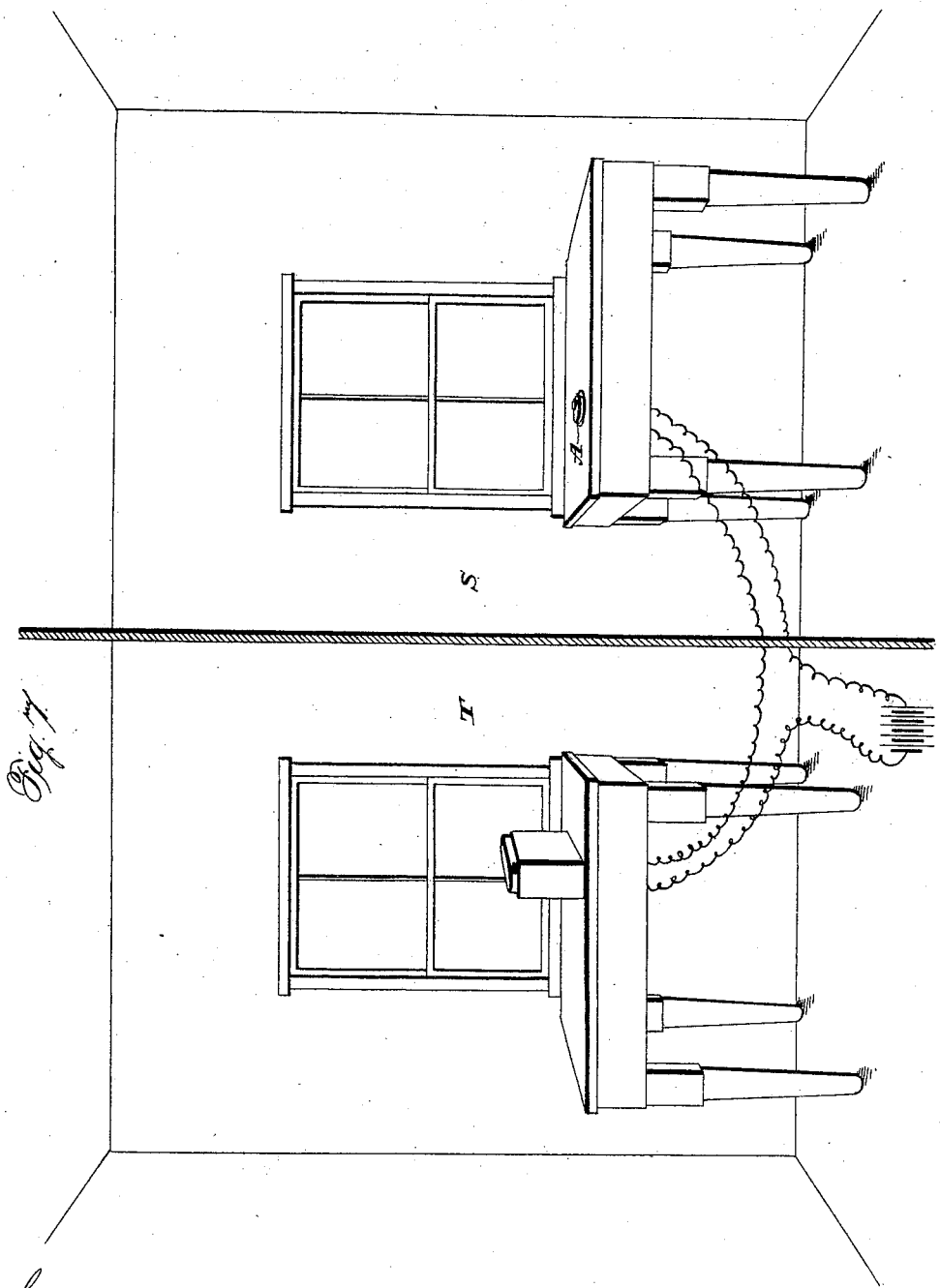

UNITED STATES PATENT OFFICE.

GEORGE E. HUNTER AND FREDERICK H. CORTHELL, OF ELGIN, ASSIGNORS TO THE ELGIN NATIONAL WATCH COMPANY, OF CHICAGO, ILLINOIS.

APPARATUS FOR ADJUSTING WATCHES.

SPECIFICATION forming part of Letters Patent No. 437,206, dated September 30, 1890.

Application filed February 13, 1890. Serial No. 340,321. (No model.)

*To all whom it may concern:*

Be it known that we, GEORGE E. HUNTER and FREDERICK H. CORTHELL, of Elgin, in the county of Kane, and in the State of Illinois, have invented certain new and useful Improvements in Apparatus for Adjusting Watches; and we do hereby declare that the following is a full, clear, and exact description thereof, reference being had to the accompanying drawings, in which—

Figure 1:
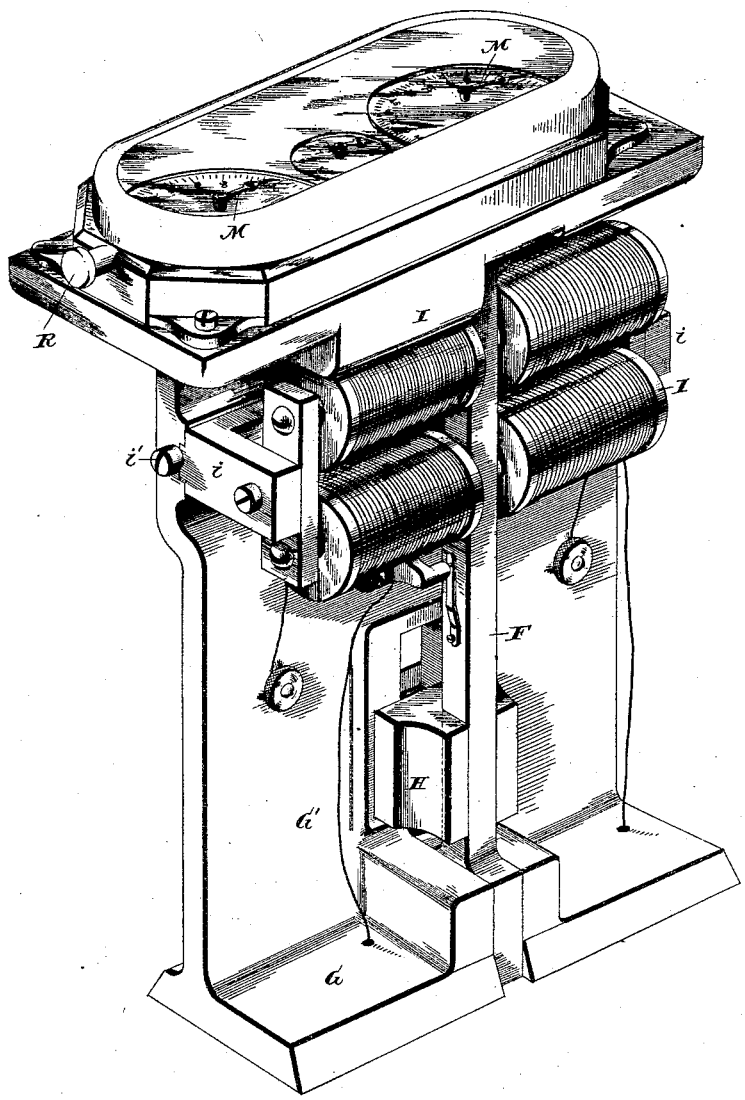
Figure 2:
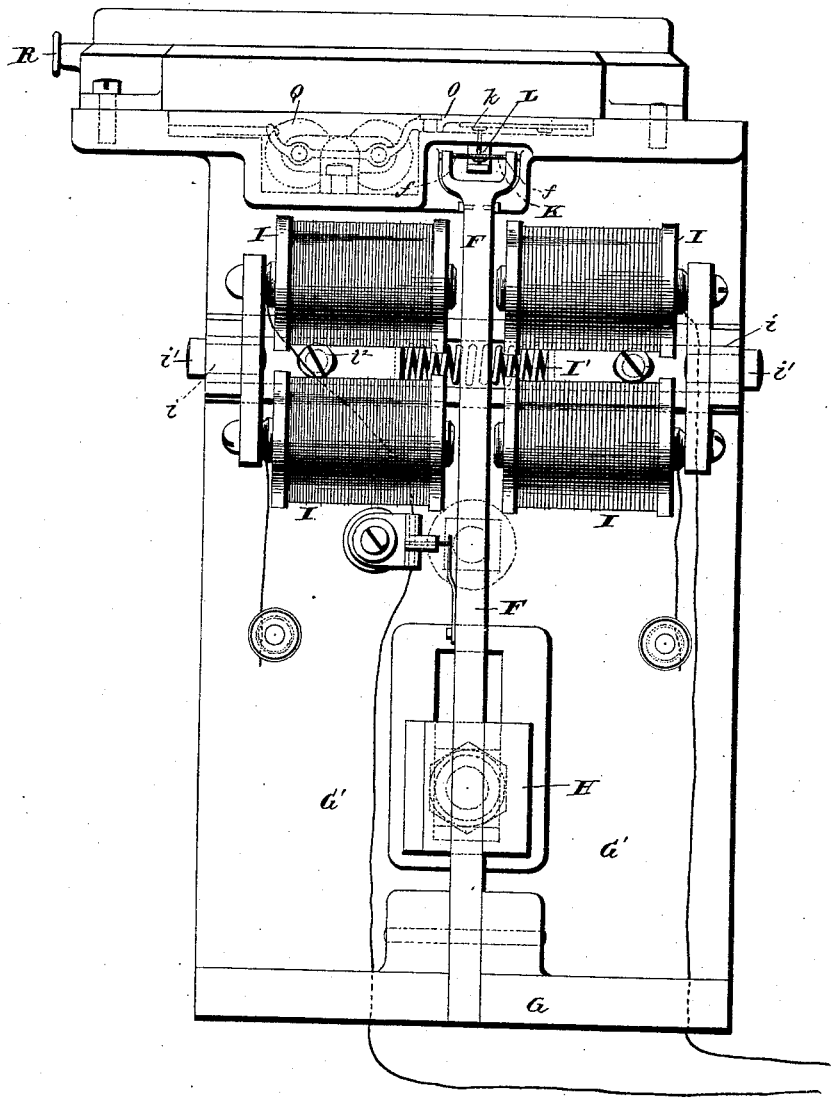
Figure 3:
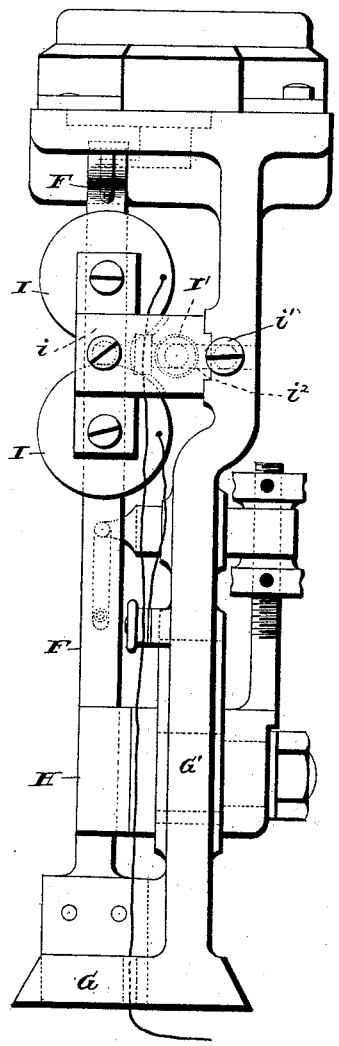
Figure 4:
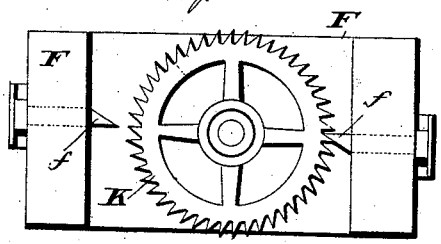
Figure 5:
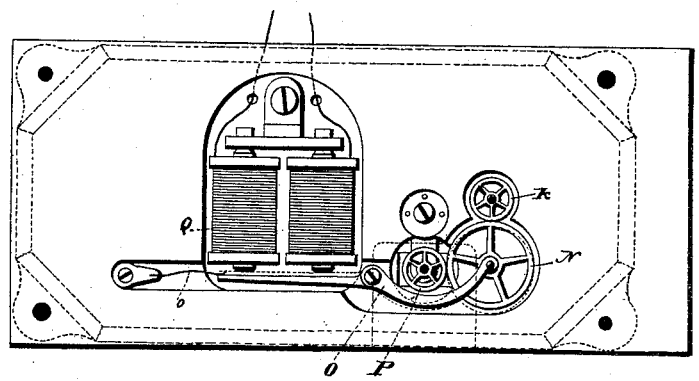
Figure 6:
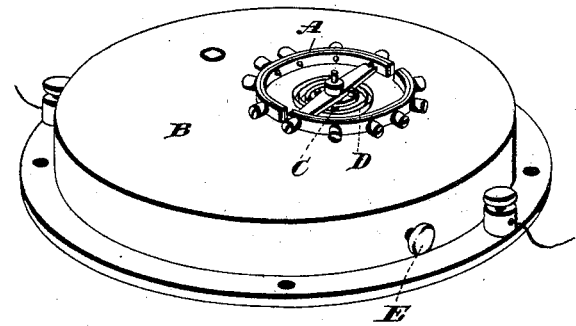

Figure 1 is a perspective view of the recording mechanism. Figs. 2 and 3 are respectively enlarged side and end elevations of the same. Fig. 4 is an enlarged plan view of the upper end of the vibratile reed and the wheel engaged by the same. Fig. 5 is a like view of the mechanism employed for connecting and disconnecting the vibratile reed with the registering mechanism. Fig. 6 is a perspective view of the mechanism preferably employed for vibrating a balance or hair-spring; and Fig. 7 is a perspective view, partly in section, of our apparatus as arranged for use.

Letters of like name and kind refer to like parts in each of the figures.

Our invention relates to the adjustment of watches, and is designed to facilitate and render more exact the adjustment of the balance and the hair-spring under extremes of temperature; to which end said invention consists in the mechanism used, substantially as and for the purpose hereinafter specified.

Our invention contemplates the vibration of a balance a predetermined number of times in connection with a standard hair-spring within a compartment which has its temperature kept uniformly at one of the extremes, and the registration of the time required for such vibrations by mechanism that is outside of such compartment, but is connected with the vibrating mechanism, so that when the latter is started or stopped the former will be automatically and simultaneously set in motion and stopped and will show accurately and in minute divisions the time required for making such vibrations.

For the purpose of vibrating a balance A we preferably employ an ordinary time-train, which is inclosed within a suitable casing B and actuated by a spring or weight. The balance-arbor C projects above the said casing and is provided with a hair-spring D of standard strength and is adapted to receive and carry a balance and to permit of the easy placing in or removing of the same from position. The time-train is provided with ordinary stop mechanism which may be released by a push-button E, and when so released will permit the train to run until a certain number of vibrations have been made by the balance, when further motion will be automatically arrested. The construction of said vibrating mechanism will be readily understood and requires no special description.

For measuring the length of time required for the vibrations of the balance A we employ a vibratile reed F, which is constructed from soft iron and has one of its ends secured within a suitable base G, from whence said reed projects upward, as shown. For the purpose of determining and varying the operative length of said reed, its lower portion passes through a fulcrum-block H, which closely embraces and is adjustable lengthwise of the same, and is supported by or upon a standard G', that extends upward from the base G.

Upon opposite sides of the reed F are placed electro-magnets I and I, which are suitably connected with each other and with a source of electric energy and operate by alternate attraction to give to said reed a vibratory motion in substantially the same manner as in case of the hammer of an electric bell. The length of time required for each vibration is determined by the operative length of said reed and is in no manner dependent upon the strength of the electric current, so that an absolute uniform rate of motion is obtained by the action of a current having sufficient strength to set the reed in motion. In order that said magnets may be easily adjusted to position with relation to said reed, each is secured upon a head or block *i*, which is adapted to be moved horizontally upon or within the standard G', and is preferably so moved by a screw $i'$, and when in position is locked in place by means of another screw $i^2$, that passes through an elongated opening in said head and has its threaded end contained within said standard. A spiral spring $I'$ placed between said heads operates to press the same outward against their regulating-screws $i$.

Changes of temperature may vary the operative length of the reed F and so change the rate of its movements; but such changes may be compensated for by adjusting the fulcrum-block H until the sound produced by said reed has the required pitch, as determined by comparison with a tuning-fork, pitch-pipe, or other standard.

The vibrating motion of the reed F is utilized to give motion to or to permit the movement of a train of gearing in the following manner—viz., secured to or formed upon the upper end of said reed are two pallets $f$ and $f$, which are oppositely arranged and at such relative distance as to permit of the placing between of an escape-wheel K, which wheel is journaled upon a relatively stationary supporting plate or frame L, and is connected with a train of wheels that actuate register-hands M and M. As preferably arranged, the vibrations of the reed F through the pallets $f$ and $f$ cause the wheel K to have a step-by-step rotation and the registering mechanism to be actuated so as to show upon the dials thereof the number of such vibrations during a given time; but, if desired, said registering mechanism may be driven by a spring or weight and its motion permitted and governed by the reed-actuated escapement.

It is intended that the vibrations of the reed F and the rotation of the escape-wheel K shall be constant, and that the connection between the latter and the registering-train shall be made or broken at the instant when the balance-vibrating mechanism is started or stops. This is preferably effected by means of a wheel N, which is journaled upon one end of a pivoted bar O and supported in such position that while always meshing with one of the wheels P of the register-train it is capable of being moved into or out of engagement with a wheel $k$ upon the arbor of said escape-wheel by a movement of said bar.

Opposite to the rear end of the bar O is placed an electro-magnet O′, which is connected with a source of electric energy, and such connection opened or closed by means of or through the stop device that releases or arrests the operative mechanism for vibrating a balance, so that upon pressing the button E of the latter the current is cut off from said magnet and said bar is free to be moved by a spring $o$, so as to cause the wheels N and $k$ to mesh and the registering-train to act, while when said stop device acts to arrest the motion of said balance-vibrating mechanism it also opens the electric circuit and causes said magnet to move said pivoted bar in an opposite direction and thereby break the connection between the vibrating reed and registering-train when the latter will instantly stop. The hands of said registering mechanism are set at zero by means of the well-known devices employed for such purpose, which devices are operated by a push-button R.

In the use of our invention the balance-vibrating mechanism is placed within a compartment S, which has its temperature regulated to and kept at the desired point—either the upper or lower extreme—while the registering mechanism is placed within a separate compartment T and connected electrically with the former. A balance is now placed in position and vibrated and the time required for such vibrations registered for comparison with an established standard, and with the time required for a like number of vibrations of the same balance within the other extreme of temperature, and in consequence of the very fine divisions of time shown by the register the detection of exceedingly small differences in the lengths of time covered by single vibrations becomes practicable.

It will be seen that the higher the rate of vibration of the reed the finer will be the divisions of time shown by the registering mechanism and the smaller the error in the balance which can be detected. It is practicable to secure twenty thousand vibrations of said reed per minute, which will enable an error in the balance of one second in twenty-four hours to be shown.

For testing hair-springs precisely the same mechanism is employed as that described, except that a standard balance instead of a standard hair-spring is secured upon the balance-arbor and provision made for the ready attachment and removal of the hair-springs to be tried.

The same apparatus we herein show and describe is also shown and described in our applications, Serial No. 340,320, filed on an even date herewith, and Serial Nos. 324,820 and 324,821, filed September 23, 1889.

Having thus described our invention, what we claim is—

1. As a means for testing balances and hair-springs in extremes of temperature, the combination of a compartment which is adapted to be given the desired temperature, mechanism arranged therein for vibrating a balance or hair-spring a predetermined number of times, mechanism arranged outside for registering the time required for such vibrations, and mechanism for connecting said vibrating and registering mechanisms, so that they will be simultaneously started and stopped, substantially as and for the purpose specified.

2. As an improvement in the adjustment of watches, a mechanism for vibrating a balance or hair-spring a predetermined number of times, and a mechanism for registering the time required for such vibrations, which mechanisms are placed in different compartments and connected so that they will be simultaneously started and stopped, substantially as and for the purpose set forth.

In testimony that we claim the foregoing we have hereunto set our hands this 23d day of October, 1889.

GEO. E. HUNTER.
FRED. H. CORTHELL.

Witnesses:
GEO. S. PRINDLE,
JOHN H. JONES.